United States Patent Office 3,541,164
Patented Nov. 17, 1970

3,541,164
FRACTIONATION OF MONOCHLOROPARAFFINS
Thomas A. Washall, Wilmington, Del., and Frank W. Melpolder, Wallingford, and Leonard N. Leum, Media, Pa., assignors to Atlantic Richfield Company, Philadelphia, Pa., a corporation of Pennsylvania
No Drawing. Filed Sept. 16, 1968, Ser. No. 762,359
Int. Cl. C07c *17/38, 18/00*
U.S. Cl. 260—652                                           4 Claims

ABSTRACT OF THE DISCLOSURE

Fractionation of monochloroparaffins both by molecular weight and by position of the chlorine atom on the chain is accomplished by a silica gel adsorption method.

BACKGROUND OF THE INVENTION

Field of the invention

This invention relates to a method for separating straight chain monochloroparaffins by molecular weight and position isomer type by percolating the monochloroparaffins through a bed of silica gel adsorbent.

PRIOR ART

No prior art is known relating to the separation of monochloroparaffins by position isomer type and molecular weight utilizing silica gel adsorption.

SUMMARY OF THE INVENTION

In accordance with this invention monochloroparaffins particularly in the $C_8$ to $C_{18}$ range are separated into molecular weight ranges and position isomer types by percolation through a bed of silica gel adsorbent. In general, the 1-monochloroparaffins are adsorbed most strongly and the adsorbability decreases as the position of the chlorine atom approaches the center of the hydrocarbon chain. In molecular weight separation the higher molecular weight monochloroparaffins are less strongly adsorbed than the lower molecular weight monochloroparaffins.

It is an object of this invention therefore to provide a method for the separation of monochloroparaffins into molecular weight ranges.

It is another object of this invention to provide a method for the separation of monochloroparaffins into position isomer types.

It is another object of this invention to provide a method for the separation of monochloroparaffins by molecular weight and isomer type utilizing a silica gel adsorbent.

Other objects of this invention will be apparent from the following description of the preferred embodiments and from the claims.

DESCRIPTION OF THE PREFERRED EMBODIMENTS

This invention is particularly applicable to the separation of straight chain monochloroparaffins in the $C_8$ to $C_{18}$ range into molecular weight ranges and into isomer types. It is particularly suitable for separating straight chain monochloroparaffins in the $C_{10}$ to $C_{14}$ range.

The silica gel employed is the ordinary commercial material manufactured for adsorption purposes.

In carrying out the separation the monochloroparaffin-containing charge stock is charged to the silica gel bed which has been pre-wet with a saturated hydrocarbon solvent wherein the hydrocarbon is an alkane and contains from 5 to 8 carbon atoms. Normal pentane is particularly preferred.

After the charge has entered the gel bed additional amounts of the same saturated hydrocarbon is added to push or wash the charge through the adsorbent. If the charge stock contains paraffins as well as monochloroparaffins, the paraffins will be eluted from the bed first. The next fraction contains the higher molecular weight monochloroparaffins and the successive fractions contain the successively lower molecular weight monochloroparaffins. The first monochloroparaffin fraction also contains the isomers wherein the chlorine atom is attached to the more centrally located carbon atoms. In the subsequent fractions the isomers are those in which the carbon atom is successively closer to the terminal carbon atom and the final fraction contains the 1-chloro compounds since these are the most strongly adsorbed and therefore the last to be eluted.

The quantity of monochloroparaffin charged to the silica gel bed is preferably not in excess of 80 grams per 100 grams of the gel. Amounts ranging between 20 and 80 are the most preferable. The quality of saturated hydrocarbon used for washing can vary rather widely, however, it is preferred to wash with about 3 to 4 vol. (ml.) of hydrocarbon per gram of gel. In general the amount should, of course, be sufficient to completely wash the charge through the bed and thus amounts in excess of those mentioned may be used.

If polychloroparaffins or a mixture of polychloroparaffins and aromatics are contained in the charge these are strongly adsorbed on the silica gel and are not removed by washing with the saturated solvent used to fractionate the monochloroparaffins. The concentration of these will increase until equilibrium is attained and they appear in the effluent.

In order to prevent contamination of the monochloroparaffins the bed is washed either with benzene or pentene-1, preferably pentene-1. All the adsorbed polychloroparaffins and aromatics are thus desorbed. The bed can then be regenerated by washing with n-pentane or other 5 to 8 carbon atom saturated hydrocarbon solvent.

In general, the separation is carried out at room temperatures and pressures, although higher temperatures and superatmospheric pressures may be used if molecular weight fractions at the upper end of the range are being separated, since these have higher viscosities and therefore are percolated more slowly. The higher temperature or pressure or both will speed their percolation.

Since the separation is not complete in a single pass it is preferred if highly purified components are to be obtained that successive passes of the individual fractions be made. By such a procedure, excellent separations both with respect to molecular weight and with position isomers in a given molecular weight fraction can be obtained. In the example which follows data are shown to demonstrate this invention in greater detail. It should be understood, however, that this data set forth herein should not be construed as limiting.

EXAMPLE I

A sample of a chlorinated paraffin fraction was found to contain 89.0 weight percent $C_{10}$ to $C_{13}$ paraffins, 10.4 weight percent $C_{10}$ to $C_{13}$ monochloroparaffins and 0.6 weight percent di- and polychloroparaffins. A 12″ by 1″ diameter column was packed with 100 grams of commercial 28–200 mesh silica gel and the gel was then pre-wet with n-pentane. A charge of 80 grams was introduced into this column followed by 350 ml. of n-pentane as the last of the charge entered the gel bed. Three fractions were collected. The first fraction was the paraffin fraction, 70.2 weight percent and contained only paraffins. The intermediate fraction amounted to 22.2 weight percent and contained 68.3 percent paraffins, 32.1 percent monochloroparaffins and 0.3 percent di- and polychloroparaffins. The final fraction amounted to 7.6 weight percent and contained 97.6 weight percent monochloroparaffin, 1.7 weight percent paraffin and 0.7 weight percent di- and polychloroparaffin. Table I shows the molecular weight distribution of the monochloroparaffins in the intermediate and final fractions.

TABLE I

| Carbon Number | Intermediate | Final |
|---|---|---|
| $C_{10}$ | 4.1 | 12.5 |
| $C_{11}$ | 29.8 | 40.9 |
| $C_{12}$ | 32.8 | 27.8 |
| $C_{13}$ | 33.3 | 18.8 |
| Total | 100.0 | 100.0 |

It will be seen that in general the $C_{10}$ and $C_{11}$ monochloroparaffins were enriched in the final fraction while the $C_{12}$ and $C_{13}$ monochloroparaffins tended to concentrate in the intermediate fraction.

Table II shows that fractionation according to the position of the chlorine atom also occurred.

TABLE II

| Cl-Position | Intermediate | Final |
|---|---|---|
| 1-Cl-$C_{10}$ | 6.9 | 12.6 |
| 2-Cl-$C_{10}$ | 11.6 | 26.7 |
| 3-Cl-$C_{10}$ | 26.4 | 23.2 |
| 4 and 5-Cl-$C_{10}$ | 55.1 | 37.5 |
| Total | 100.0 | 100.0 |
| 1-Cl-$C_{11}$ | 7.8 | 11.0 |
| 2-Cl-$C_{11}$ | 13.3 | 28.1 |
| 3-Cl-$C_{11}$ | 21.1 | 20.6 |
| 4, 5 and 6-Cl-$C_{11}$ | 57.8 | 40.3 |
| Total | 100.0 | 100.0 |
| 1-Cl-$C_{12}$ | 6.7 | 10.6 |
| 2-Cl-$C_{12}$ | 13.5 | 28.6 |
| 3-Cl-$C_{12}$ | 19.7 | 19.7 |
| 4, 5 and 6-Cl-$C_{12}$ | 60.1 | 41.1 |
| Total | 100.0 | 100.0 |
| 1-Cl-$C_{13}$ | 6.0 | 9.8 |
| 2-Cl-$C_{13}$ | 13.1 | 29.3 |
| 3-Cl-$C_{13}$ | 17.2 | 18.3 |
| 4, 5, 6 and 7-Cl-$C_{13}$ | 63.7 | 42.6 |
| Total | 100.0 | 100.0 |

In general, the intermediate fraction was enriched in the isomers having the chlorine atom on the third carbon or higher numbered position while the final fraction was enriched in the isomers having the chlorine atom on the terminal carbon atom (1-position) or on the 1-carbon atom.

Although the foregoing example was carried out on the total paraffin chlorination reaction mixture a preliminary separation of the paraffins and monochloroparaffins can be carried out and thereafter the monochloroparaffin fraction separated in successive passes in accordance with the foregoing procedure. In general it is preferred to follow each pass with a wash of the saturated hydrocarbon to insure complete removal of all materials from the previous separation. Thus, in the foregoing procedure a wash of 400 ml. of n-pentane would be a preferred procedure.

As many possible embodiments can be made of this invention without departing from the broad scope thereof, it is to be understood that all matter herein set forth is to be interpreted as illustrative and not as unduly limiting the invention.

We claim:
1. A method for separating straight chain monochloroparaffins having from 8 to 18 carbon atoms in the molecule by molecular weight and position isomer type which comprises passing a mixture of said monochloroparaffins through a bed of silica gel, passing an alkane containing from 5 to 8 carbon atoms in the molecule through the silica gel bed, collecting a first fraction comprised of monochloroparaffins predominantly of highest molecular weight and having the chlorine atom attached to the carbon atoms nearest the center of the molecule and thereafter collecting successive fractions of successively lower molecular weight and with the chlorine atom attached to the carbon atom successively nearer the end of the chain.

2. The method according to claim 1 wherein the monochloroparaffins contain from 10 to 14 carbon atoms.

3. The method according to claim 1 wherein the alkane is n-pentane.

4. The method according to claim 1 wherein each of said fractions collected is separately passed through said silica gel bed to obtain further separation of said molecular weight and position isomer type.

References Cited

UNITED STATES PATENTS 2,644,018  6/1953  Harper.
2,712,986  2/1955  Huckabay.

HOWARD T. MARS, Primary Examiner